(12) United States Patent
Wright

(10) Patent No.: US 12,010,221 B2
(45) Date of Patent: Jun. 11, 2024

(54) METHOD AND SYSTEM FOR COMMUNICATING A SECRET

(71) Applicant: nChain Holdings Limited, St. John's (AG)

(72) Inventor: Craig Steven Wright, London (GB)

(73) Assignee: nChain Licensing AG, Zug (CH)

( * ) Notice: Subject to any disclaimer, the term of this patent is extended or adjusted under 35 U.S.C. 154(b) by 0 days.

(21) Appl. No.: 17/947,151

(22) Filed: Sep. 18, 2022

(65) Prior Publication Data

US 2023/0179408 A1    Jun. 8, 2023

Related U.S. Application Data

(63) Continuation of application No. 17/055,095, filed as application No. PCT/IB2019/053909 on May 13, 2019, now Pat. No. 11,451,382.

(30) Foreign Application Priority Data

May 14, 2018    (GB) ...................................... 1807822

(51) Int. Cl.
*H04L 29/06*    (2006.01)
*G06F 21/00*    (2013.01)
(Continued)

(52) U.S. Cl.
CPC ............ *H04L 9/085* (2013.01); *H04L 9/0825* (2013.01); *H04L 9/3013* (2013.01); *H04L 9/3066* (2013.01); *H04L 9/3236* (2013.01)

(58) Field of Classification Search
None
See application file for complete search history.

(56) References Cited

U.S. PATENT DOCUMENTS

| | | | |
|---|---|---|---|
| 6,748,410 B1 * | 6/2004 | Gressel | G06F 7/728 708/491 |
| 6,834,272 B1 * | 12/2004 | Naor | G06Q 20/0855 705/37 |

(Continued)

FOREIGN PATENT DOCUMENTS

WO    2017145016 A1    8/2017

OTHER PUBLICATIONS

Bellare et al. "Non-Interactive Oblivious Transfer and Applications," MIT Laboratory for Computer Science, 1989, 11 pages.

(Continued)

*Primary Examiner* — Lisa C Lewis
(74) *Attorney, Agent, or Firm* — Davis Wright Tremaine LLP

(57) ABSTRACT

A method of communicating a secret ($k_0$, $k_1$) on the Bitcoin blockchain is disclosed. The method comprises sending information identifying secrets selectable by the recipient and receiving a first public key ($U_i$) of an elliptic curve cryptography system, corresponding to a first secret ($S_i$) selected for access by the recipient and for which a first private key (m) is accessible to the recipient. A second public key ($U_{1-i}$) is received, corresponding to a second secret not selected for access by the recipient, wherein a corresponding second private key is not available to the recipient. First and second secrets encrypted by means of the respective first and second public keys ($X_0$, $X_1$) are sent to the recipient, wherein the first secret is accessible to the recipient by means of the first private key, the second secret is inaccessible to the recipient, and the sender is unable to distinguish between the first and second secrets.

17 Claims, 6 Drawing Sheets

(51) Int. Cl.
*H04L 9/08* (2006.01)
*H04L 9/30* (2006.01)
*H04L 9/32* (2006.01)

(56) References Cited

U.S. PATENT DOCUMENTS

| | | | |
|---|---|---|---|
| 10,050,779 B2 | 8/2018 | Alness et al. | |
| 2012/0213359 A1* | 8/2012 | Troncoso Pastoriza | ............... H04L 9/008 380/28 |
| 2013/0212391 A1* | 8/2013 | Chen | ............... H04L 9/3252 713/170 |
| 2015/0341326 A1 | 11/2015 | Premnath et al. | |
| 2017/0147835 A1 | 5/2017 | Bacon et al. | |

OTHER PUBLICATIONS

Cheung et al. "Secure Multiparty Computation between Distrusted Networks Terminals," Dec. 4, 2007, 21 pages.
International Search Report and Written Opinion dated Jul. 19, 2019, Patent Application No. PCT/IB2019/053909, 10 pages.
International Search Report and Written Opinion dated Mar. 30, 2017, Patent Application No. PCT/IB2018/053359, 13 pages.
Parakh, "Communication Efficient Oblivious Transfer Using Elliptic Curves," 2012 IEEE 14th International Symposium on High-Assurance Systems Engineering, Oct. 25, 2012, 2 pages.
Parakh, "Oblivious Transfer Using Elliptic Curves," 15th International Conference on Computing, May 24, 2006, 10 pages.
Siim, "The Simplest Protocol for Oblivious Transfer," Preliminary Report in MTAT.07.022 Research Seminar in Cryptography, Dec. 15, 2015, 29 pages.
Sánchez, "Raziel: Private and Verifiable Smart Contracts on Blockchains," http://eprint.iacr.org/2017/878.pdf, 2017, 60 pages.
UK Commercial Search Report dated Jan. 11, 2019, Patent Application No. GB1807822.0, 5 pages.
UK IPO Search Report dated Oct. 15, 2018, Patent Application No. GB1807822.0, 6 pages.
Unterweger et al., "Lessons Learned from Implementing a Privacy-Preserving Smart Contract in Ethereum," 2018 9th IFIP International Conference on New Technologies, Mobility and Security (NTMS), Feb. 26, 2018, https://www.en-trust.at/papers/Unterweger18a.pdf, 5 pages.
International Search Report and Written Opinion dated Feb. 4, 2019, Patent Application No. PCT/IB2018/053359, 12 pages.
Nakamoto, "Bitcoin: A Peer-to-Peer Electronic Cash System," Bitcoin, Oct. 31, 2008, https://bitcoin.org/bitcoin.pdf, 9 pages.
Satoshi et al., "Connection Limits," Bitcoin Forum, Aug. 9, 2010, https://bitcointalk.org/index.php?topic=741.0;prev_next=prev, 2 pages.
Antonopoulos, "Mastering Bitcoin—Unlocking Digital Cryptocurrencies," O'Reilly Media, Inc., Dec. 20, 2014, 282 pages.

* cited by examiner

METHOD AND SYSTEM FOR COMMUNICATING A SECRET

CROSS REFERENCE TO RELATED APPLICATIONS

This application is a continuation of U.S. patent application Ser. No. 17/055,095, filed Nov. 12, 2020, entitled "METHOD AND SYSTEM FOR COMMUNICATING A SECRET," which is a 371 National Stage Patent Application of International Patent Application No. PCT/IB2019/053909, filed May 13, 2019, which claims priority to United Kingdom Patent Application No. 1807822.0, filed May 14, 2018, and International Patent Application No. PCT/IB2018/053359, filed May 14, 2018, the disclosures of which are incorporated herein by reference in their entirety.

TECHNICAL FIELD

The present disclosure relates to a computer implemented system and method, and more particularly to a computer implemented system and method for transferring a digital asset. The disclosure is particularly suited, but not limited to, a blockchain-based data transfer system.

BACKGROUND

In this document we use the term 'blockchain' to include all forms of electronic, computer-based, distributed ledgers. These include consensus-based blockchain and transaction-chain technologies, permissioned and un-permissioned ledgers, shared ledgers and variations thereof. The most widely known application of blockchain technology is the Bitcoin ledger, although other blockchain implementations have been proposed and developed. While Bitcoin may be referred to herein for the purpose of convenience and illustration, it should be noted that the disclosure is not limited to use with the Bitcoin blockchain and alternative blockchain implementations and protocols fall within the scope of the present disclosure. The term "user" may refer herein to a human or a processor-based resource.

A blockchain is a peer-to-peer, electronic ledger which is implemented as a computer-based decentralised, distributed system made up of blocks which in turn are made up of transactions. Each transaction is a data structure that encodes the transfer of control of a digital asset between participants in the blockchain system, and includes at least one input and at least one output. Each block contains a hash of the previous block so that blocks become chained together to create a permanent, unalterable record of all transactions which have been written to the blockchain since its inception. Transactions contain small programs known as scripts embedded into their inputs and outputs, which specify how and by whom the outputs of the transactions can be accessed. On the Bitcoin platform, these scripts are written using a stack-based scripting language.

In order for a transaction to be written to the blockchain, it must be "validated". Network nodes (miners) perform work to ensure that each transaction is valid, with invalid transactions rejected from the network. Software clients installed on the nodes perform this validation work on an unspent transaction (UTXO) by executing its locking and unlocking scripts. If execution of the locking and unlocking scripts evaluate to TRUE, the transaction is valid and the transaction is written to the blockchain. Thus, in order for a transaction to be written to the blockchain, it must be i) validated by the first node that receives the transaction—if the transaction is validated, the node relays it to the other nodes in the network; and ii) added to a new block built by a miner; and iii) mined, i.e. added to the public ledger of past transactions.

Although blockchain technology is most widely known for the use of cryptocurrency implementation, digital entrepreneurs have begun exploring the use of both the cryptographic security system Bitcoin is based on and the data that can be stored on the Blockchain to implement new systems. It would be highly advantageous if the blockchain could be used for automated tasks and processes which are not limited to the realm of cryptocurrency. Such solutions would be able to harness the benefits of the blockchain (e.g. a permanent, tamper proof records of events, distributed processing etc) while being more versatile in their applications.

In the case of exchange of data between parties, it is often desirable for a recipient of data files to be able to access only one, or a limited number of, files from a selection, while not enabling a sender of the data to know which file was accessed. This arrangement is known as Oblivious Transfer and is described below with reference to FIGS. 1 to 3.

Referring to FIG. 1, Oblivious Transfer is a method for controlling the access of a resource (a file, database record, or any other digital asset), and transferring that resource with enhanced privacy. The basic problem of Oblivious Transfer is to define a mechanism where the sender should not learn which, of many files sent to the receiver, the receiver opens. Alice is the sender, Bob is the receiver, m is a message, and b is the index of the message. Alice sends a number of messages, Bob selects which ones he wishes to receive and decode. Alice does not know which ones Bob selects.

A basic mechanism can be defined by considering Diffie-Hellman (DH) key exchange [10] with reference to FIG. 2. It can be seen in CDH (Core Diffie Hellman) key exchange as shown in FIG. 2 that it is clear which keys are being exchanged, and therefore which message will be decrypted as a result of the Diffie Hellman protocol. C is the encrypted message, E is the encryption function, which takes the arguments of the private key K, and the message m, and D is the decryption function which takes the arguments of the encrypted message C and the private key K. Knowledge by third parties of which message is being decrypted can under certain circumstances lead to reduced security of data, which can lead to unauthorised parties accessing data.

Referring now to FIG. 3, a variation of the DH mechanism to accommodate Oblivious Transfer is described. It can be seen that the receiver sends multiple keys back to the sender, with only one key being authentic, the others being 'dummies' or redundant.

The main difference between the arrangement shown in FIG. 3 and the standard core Diffie Hellman (CDH) protocol shown in FIG. 2 is that the key being passed back from Bob to Alice depends on the value of a bit 'b'. This computation is done by Bob. Alice then constructs two keys based upon the key she received from Bob. Alice sends these two keys back to Bob. Bob is then able to decrypt the message received from Alice using the keys he received from Alice and also the key he computed from a previous value Alice passed to him. As was the case with the arrangement of FIG. 2, E is the encryption algorithm and D is the decryption algorithm. Bob can only decrypt one of the message pairs, and the other combination is a 'dummy' and does not work.

It can be seen that using the variant of the Diffie-Hellman mechanism, Alice remains 'oblivious' of the message that Bob decrypts. In this example there is only one of two possible messages that Bob can decrypt.

Thus, it is desirable to improve data security by providing an Oblivious Transfer mechanism which is applicable to the blockchain.

Such an improved solution has now been devised.

SUMMARY

Thus, in accordance with the present disclosure there is provided a method and system as defined in the appended claims.

There may be provided a method of communicating at least one secret from a sender to a recipient, the method comprising:

sending, from the sender to the recipient, information identifying a plurality of secrets selectable by the recipient;

receiving, at the sender, from the recipient, at least one first public key, corresponding to a respective first said secret selected for access by the recipient, wherein the or each said first public key is part of a public key/private key pair of an elliptic curve cryptography system and a first private key corresponding to said first public key is accessible to the recipient;

receiving, at the sender, from the recipient, at least one second public key, corresponding to a respective second said secret not selected for access by the recipient, wherein the or each said second public key is a public key of said elliptic curve cryptography system and a respective second private key, corresponding to said second public key, is not available to the recipient;

sending, from the sender to the recipient, at least one said first secret encrypted by means of the corresponding said first public key; and sending, from the sender to the recipient, at least one said second secret encrypted by means of the corresponding said second public key;

wherein the or each said first secret is accessible to said recipient by means of the corresponding said first private key, the or each said second secret is inaccessible to said recipient, and said sender is unable to distinguish between a said first secret and a said second secret.

There may be provided a method of receiving at least one secret sent from a sender to a recipient, the method comprising:

receiving, at the recipient, information identifying a plurality of secrets selectable by the recipient;

sending, to the sender, from the recipient, at least one first public key, corresponding to a respective first said secret selected for access by the recipient, wherein the or each said first public key is part of a public key/private key pair of an elliptic curve cryptography system and a first private key corresponding to said first public key is accessible to the recipient;

sending, to the sender, from the recipient, at least one second public key, corresponding to a respective second said secret not selected for access by the recipient, wherein the or each said second public key is a public key of said elliptic curve cryptography system and a respective second private key, corresponding to said second public key, is not available to the recipient;

receiving, at the recipient from the sender, at least one said first secret encrypted by means of the corresponding said first public key; and receiving, at the recipient from the sender, at least one said second secret encrypted by means of the corresponding said second public key;

wherein the or each said first secret is accessible to said recipient by means of the corresponding said first private key, the or each said second secret is inaccessible to said recipient, and said sender is unable to distinguish between a said first secret and a said second secret.

There may be provided a system, comprising:

a processor; and memory including executable instructions that, as a result of execution by the processor, causes the system to perform any embodiment of the computer-implemented method described herein.

There may be provided a non-transitory computer-readable storage medium having stored thereon executable instructions that, as a result of being executed by a processor of a computer system, cause the computer system to at least perform an embodiment of the computer-implemented method described herein.

BRIEF DESCRIPTION OF THE DRAWINGS

Various embodiments in accordance with the present disclosure will be described with reference to the drawings, in which.

DESCRIPTION OF EMBODIMENTS

Figure 1:
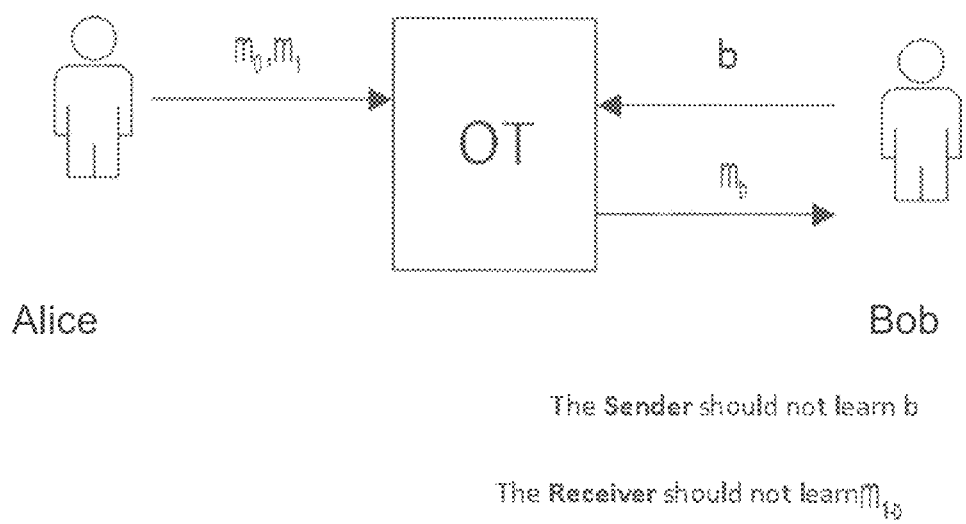
FIG. 1 illustrates a message transfer between a sender and a recipient.
Figure 2:
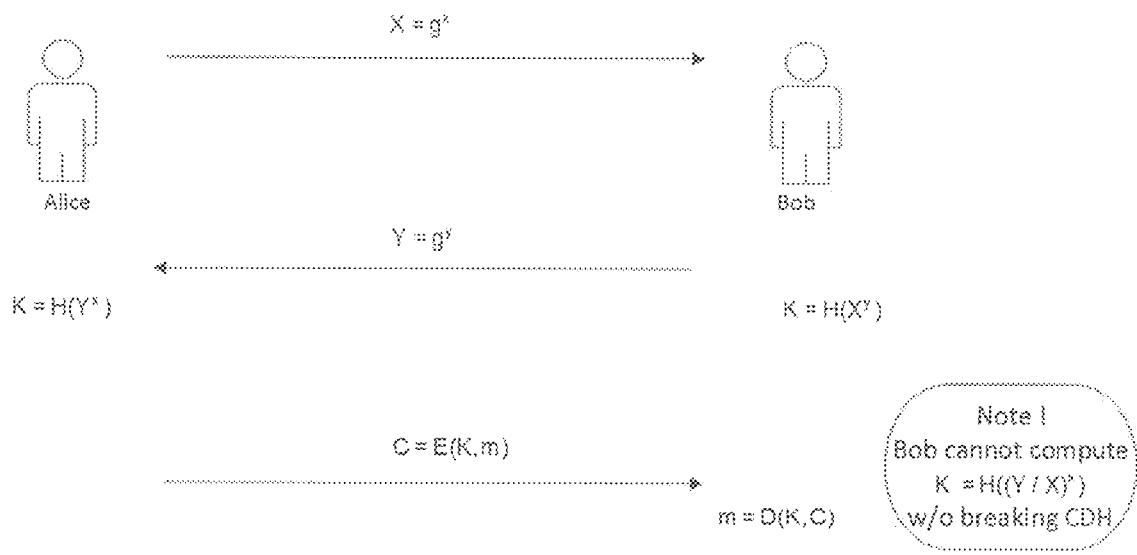
FIG. 2 illustrates operation of a Diffie Hellman key exchange.
Figure 3:
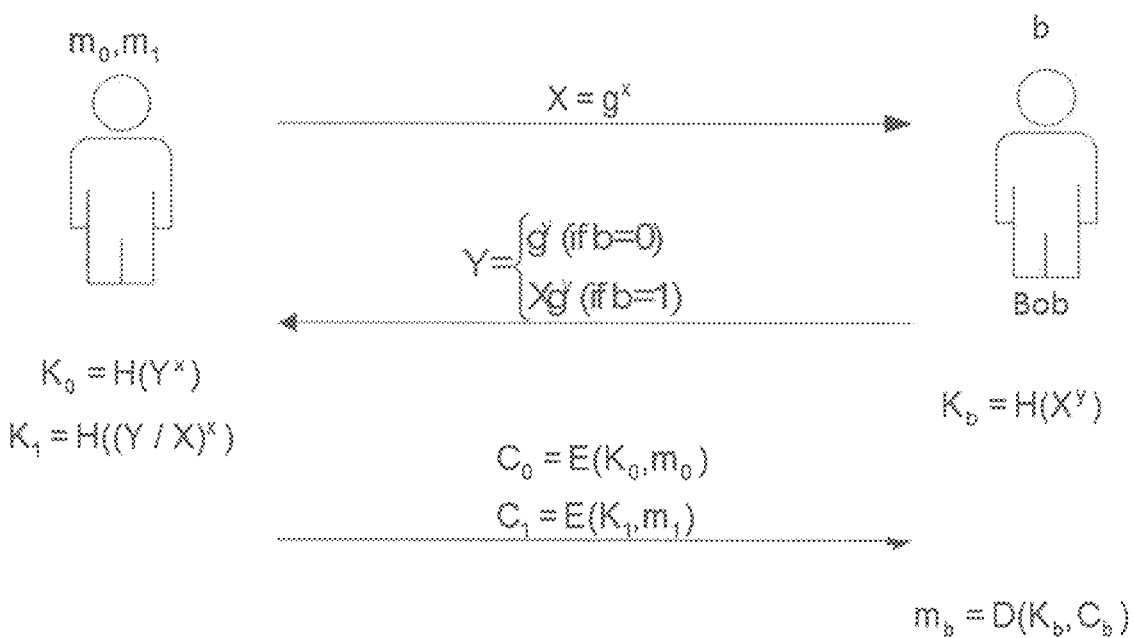
FIG. 3 illustrates the principle of operation of Oblivious Transfer.
Figure 4:
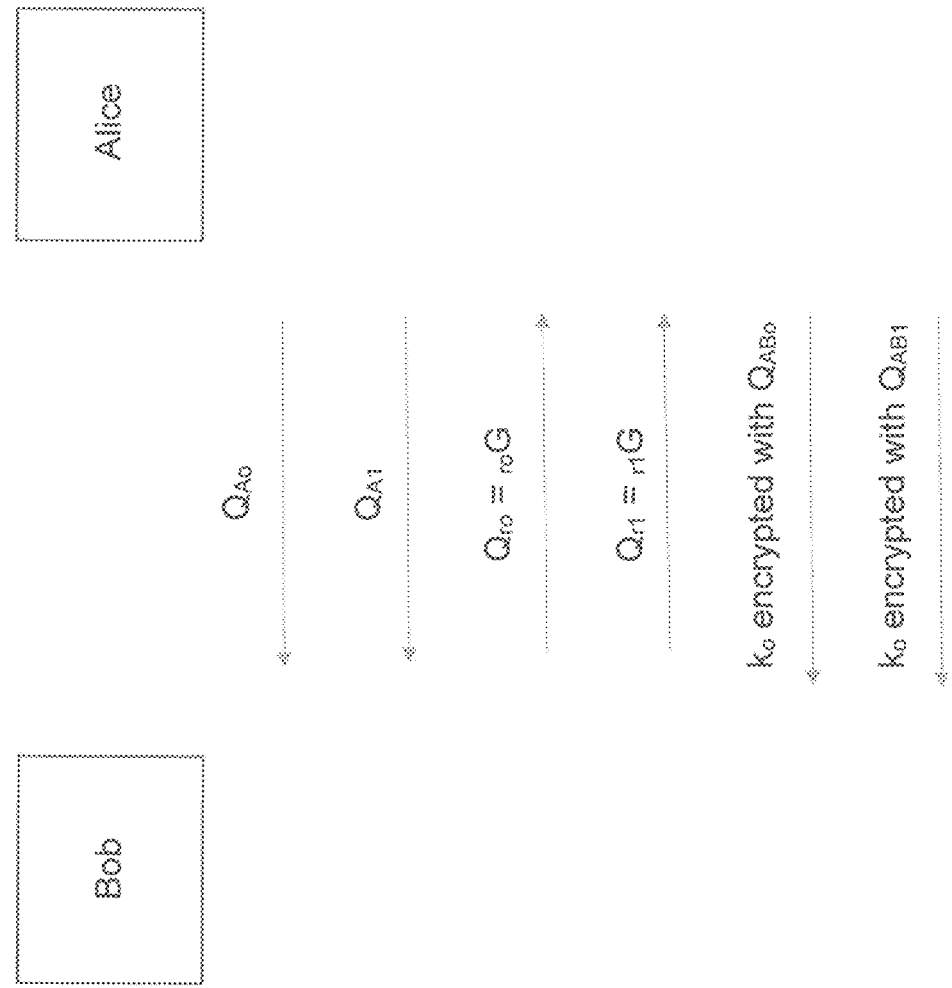
FIGS. 4 and 5 show Oblivious Transfer processes.

Referring to FIG. 4, a method for conducting an Oblivious Transfer process from a sender Bob to a recipient Alice on the Bitcoin blockchain is shown. Bob starts by creating n keys: $\{k_1, k_2, \ldots k_n\}$. These are created deterministically as a subkey of $k_0$, an elliptic curve digital signature algorithm (ECDSA) master key, by means of a method as disclosed in International patent application WO2017/145016. These n keys will be used in encrypting n different values. Alice seeks to access one and only one of these values without letting Bob know which one was selected. Bob seeks to ensure that Alice can only access a single value and one key at each exchange.

The process starts by Alice and Bob setting up the curve parameters for an elliptic curve cryptography (ECC)/elliptic curve digital signature algorithm (ECDSA) system (such as with Bitcoin).

From the ECDSA mechanism $$d_A Q_B = d_A d_B G = d_B d_A G = d_B Q_A$$

Where Alice computes a point.

$$(x_k, y_k) = d_A Q_B$$

And Bob computes a point.

$$(x_k, y_k) = d_B Q_A$$

$x_K$ is a shared secret.

$d_A$ and $d_B$ are Alice and Bob's private keys respectively.

$Q_A$ and $Q_B$ are the respective Public keys.

From this basic algorithm a method can be created to exchange a pair of numbers. This logic can be repeated $\log_2$ (n) times to select one of n values. This is done by ensuring that only one pair of keys exchanged is valid.

This first step allows Alice to select one and only one value from 2 possible choices $k_0$ and $k_1$.

1. Alice and Bob start by agreeing on a value C. They use an ECDSA exchange to select the hash of the current block height and a secret generated by their master keys. Such an exchange is described in more detail in International patent application WO2017/145016 and, $C=h(BH|S)$ or $C=h(BH|S|BLOCkhash)$ where h( ) is a hash function, and is the concatenate operator.

BH is block height.

S is shared secret generated, for example, by means of a method disclosed in International patent application WO2017/145016.

Blockhash=Blockhash

It should be noted that any random value can be used but block height is a good source of external agreed randomness.

2. Alice selects a value. She keeps this to herself. This value (i) represents a key that Bob created at $k_i$.
3. Alice then creates a subkey from her master key pair $d_A/Q_A$ by means of the method of International patent application WO2017/145016 and now has $Q_{A0}$ where $Q_A$ is the master key for $Q_{A0}$.

Alice will let Bob know $Q_{A0}$ using the ECDSA exchange first. Bob will encrypt. Bob encrypts Alice's selection $k_i$.

To ensure Bob does not know which i=0 or 1 that Alice selected, Alice also creates a decoy public key $Q_{A1}$.

4. Bob will not know which is the real value.

In the case in which Alice wishes to use private key $d_{A0}$ to decrypt the selected value Alice creates a subkey: $d_{A0}$, corresponding to public key $Q_{A0}=(x_{A0},y_{A0})$ Alice knows $d_{A0}$ and hence $Q_{A0}$ Alice also knows that:

$$d_{A0}Q_{A1} = d_{A0}d_{A1}G = d_{A1}d_{A0}G$$
$$= Q_{A0}d_{A1}$$

Alice knows $d_{A0}$ but cannot calculate $d_{A1}$.

Next Bob requires that $$C \equiv x_{A0} = d_{A0}Q_{A1}$$
$$= d_{A1}Q_{A0}$$

Alice knows $d_{A0}$ and can calculate $Q_{A1}$. $Q_{A0}$ is a product of $d_{A0}$ and is known to Alice.

5. Alice gives Bob both keys.

$Q_{A0}$ $Q_{A1}$

Even though Alice can only decode information encrypted for $Q_{A0}$. That is Alice has the private key $d_{A0}$ for $Q_{A0}$ but not the private key $d_{A1}$ for $Q_{A1}$.

6. Bob encrypts $k_i$ to Alice. In this example $k_0$ is the one Alice can decrypt. This is as Bob encrypts $k_0$ to $Q_{A0}$ and $k_i$ to $Q_{A1}$ Bob does not know if Alice wants $k_0$ or $k_i$ but he knows that she would only have one of the keys $d_{A0}$ or $d_{A1}$ that are needed to decrypt the packet.

7. Bob selects two random values $r_0$ and $r_1$. Bob computes two keys:

$Q_{r0}=r_0G$ $Q_{r1}=r_1G$ and sends these to Alice.

8. Bob calculates:

$h(Q_{A0})$ and $h(Q_{A1})$

9. Bob makes the Public keys.

$Q_{AB0}=(h(Q_{A0})+r_0)G$ $Q_{AB1}=(h(Q_{A1})+r_1)G$

Bob encrypts $k_0$ and $k_1$ with $Q_{AB0}$ and $Q_{AB1}$ respectively. Bob sends $Q_{r0}$ and $Q_{r1}$ to Alice:

$Q_{r0}=r_0G$ $Q_{r1}=r_1G$.

10. Alice cannot reverse to get $r_0$ or $r_1$.
11. Alice needs to decide but can only decrypt the one value. (The blank key is of no use). Both Alice and Bob are limited as follows: Alice can select to decrypt (receive) $k_0$ or $k_1$ but not both and Bob does not know which one so he can send both to her.

In the 1 of 2 system, Alice has two secrets but only seeks to disclose one of them. At the same time Bob does not want Alice to know which of the two secrets he wants. Bob is interested in only one of Alice's secrets but does not want Alice to know which one.

Bob receives one answer only while Alice does not know what Bob wants answered.

Figure 5:
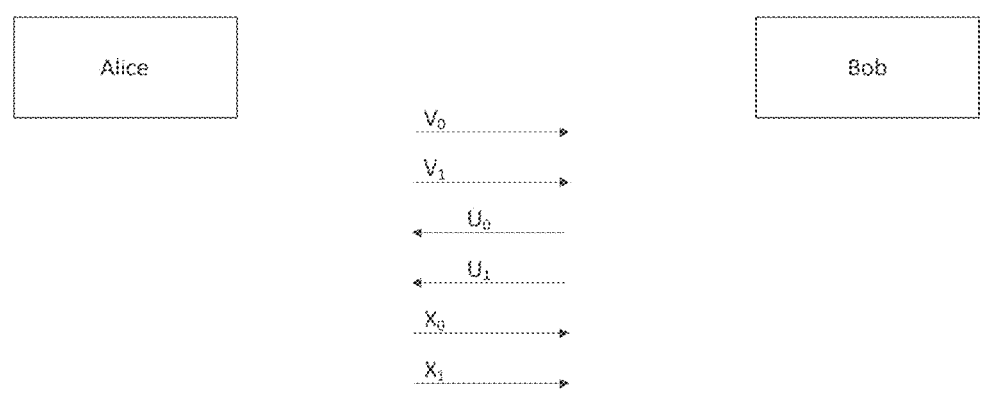

FIG. 5 shows operation of a non-interactive Oblivious Transfer protocol, which Alice starts by sending Bob two values: $k_0$ and $k_1$. These are sent as functions of Bob's public and private keys such that Bob is able to extract one and only one of the two keys.

An elliptic curve over finite field $Z_p$ with (p) as a prime is used. All values are between 0 and (p−1), and all calculations are completed modulo p.

The general form of the elliptic curve equation is:

$y^2 \bmod p = (x^3+ax=b) \bmod p$.

The set of (x,y) points that satisfy the elliptic curve equation is given by $E_p(a,b)$. The order r of a point $T=(y_1,y_1)$ on an elliptic curve is defined as the smallest positive integer r such that:

$rT=0$, where 0 is a point at infinity.

A point G is the base point in $E_p(a,b)$. This value is selected such that the order r is very large. The security of the system is based on the elliptic curve discrete logarithm problem (ECDLP) being impracticably difficult to solve. Solving the ECDLP of a point Q is equivalent to solving for an integer k such that $Q=kP$ (or $Q=kG$)

Where Q and P are known.

Alice and Bob both use the same Elliptic Curve and base Point G. Alice selects two values, $k_0$ and $k_1$ and generates two points $P_0$ and $P_1$ $P_0=k_0G$ $P_1=k_1G$.

The values $k_0$ and $k_1$ are not to be known to Bob and act as the secret key held by Alice.

These values can be determined using an exchange process as described in International patent application WO2017/145016.

If Alice has a master key of $k_{sa}$, then the values $k_0$ and $k_1$ can be linked to $k_{sa}$ $$k_{sa}+v_0=k_0$$

$$k_{sa}+v_1=k_1$$

Where $v_0$ and $v_1$ are values known by Alice. This process can be completed before the Oblivious Transfer message exchange.

The protocol is defined as follows:

Referring to FIG. 5, beginning with base point G and points $P_0$ and $P_1$.

Let: $P=P_0+P_1$

And $i \in \{0,1\}$.

1. Bob creates Public keys ($U_0$, $U_1$) by selecting a random integer in and setting:

$$U_i=mG,$$

where $U_i$ represents which of $U_0$ or $U_1$ corresponds to $k_0$ or $k_1$ Bob has selected. Bob sends public keys $U_0$ and $U_1$ to Alice.

Next let $U_b=mG-P_i$ $$U_{1-i}=P_{1-i}-U_b$$

Bob's private key is m. m can be derived using a process as described in International patent application WO2017/145016.

2. Alice selects two random integers $a_0$ and $a_1$ and computes:

$$V_0=a_0G$$

And $$V_1=a_1G.$$

Alice then computes:

$$W_0=a_0U_0$$

And $$W_1=a_1U_1$$

Alice sends the values $V_0$, $V_1$, to Bob.
Alice then computes:

$$X_0=S_0 \oplus W_0$$

And $$X_1=S_1 \oplus W_1$$

Where $S_i \oplus W_i$ represents encryption of the binary representation of secret value $S_i$ by means of an exclusive OR cipher which has the binary representation of $W_i$ as an encryption key.

Alice also sends $X_0$ and $X_1$ to Bob.

3. Bob computes the values:

$$mV_i=ma_iG=W_i$$

This allows him to extract $S_i$ as $$S_i=W_i \oplus X_i$$

$S_i$ is the $i^{th}$ secret.

It should be noted that Bob cannot extract $S_{1-i}$ as he cannot compute n where $U_{1-i}=nG$. Alice does not know which value of $U_0$ or $U_1$ equals m G such that Bob is able to determine the value of Alice therefore does not know which of the two secrets Bob has received.

Alice can validate that Bob's public keys are correctly formed by

Checking that $U_i+U_{1-i}=P$      1.

Computing $U_b=U_i-P_i$      2.

This is used to verify if it is the negative of $U_{1-i}-P_{1-i}$

Security aspects of the protocol are as follows:
1. Alice cannot deduce which of the two secrets Bob has received.
2. The security of the protocol holds if the discrete logarithm problem (DLP) holds for elliptic curves.
3. If Alice follows the protocol, Bob can only find one of her secrets.

This system allows for a fair control over an exchange. Bob and Alice can exchange information without knowing what was exchanged. This can be used to control all browsing of data or information, access to databases, and other records (for example, medical files), and this information can be segmented and divulged bit by bit with a record of which parties saw what information. It can eliminate the need for a trusted server or third party.

Figure 6:
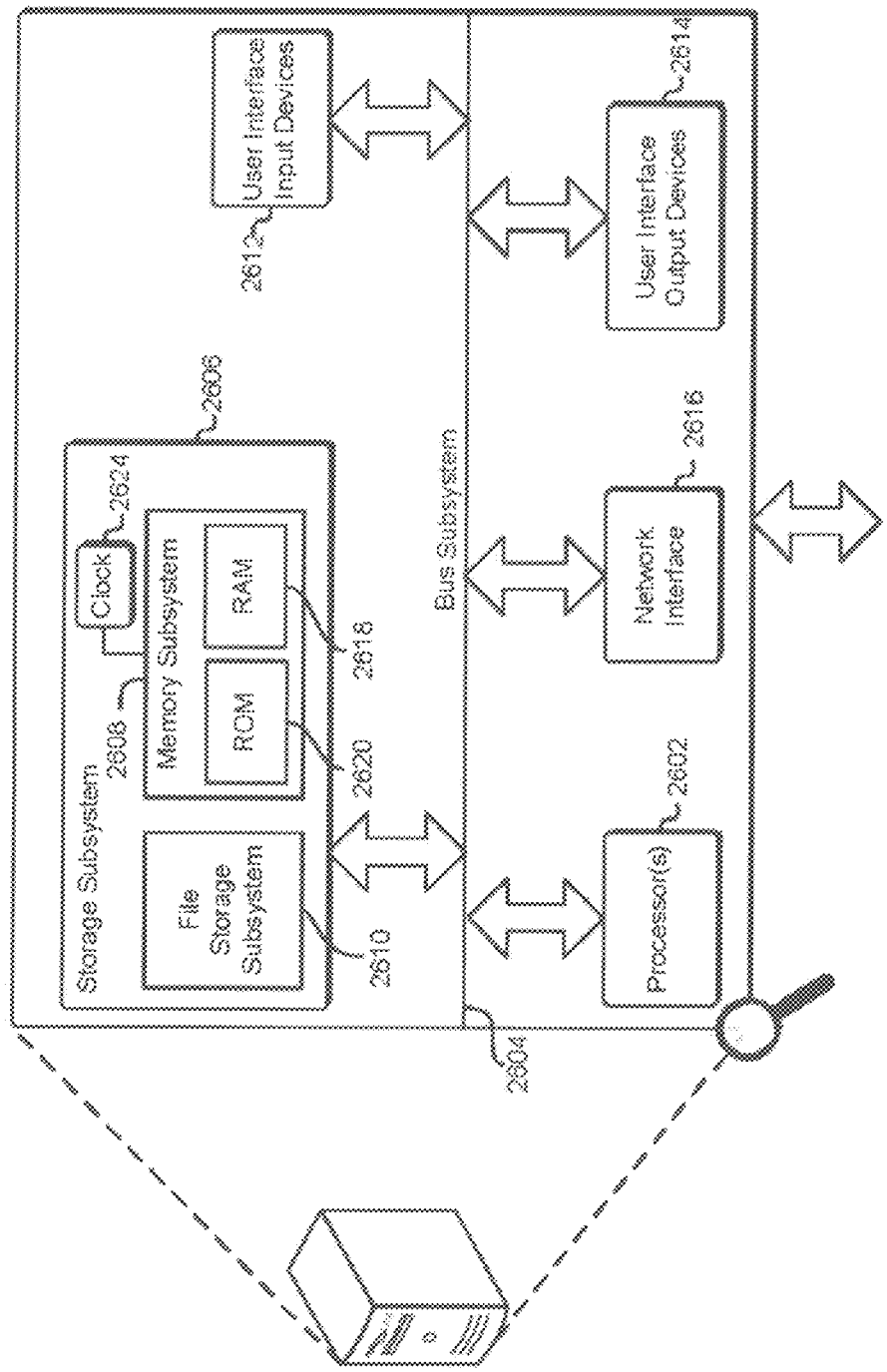
FIG. 6 is a schematic diagram illustrating a computing environment in which various embodiments can be implemented.

Turning now to FIG. 6, there is provided an illustrative, simplified block diagram of a computing device 2600 that may be used to practice at least one embodiment of the present disclosure. In various embodiments, the computing device 2600 may be used to implement any of the systems illustrated and described above. For example, the computing device 2600 may be configured for use as a data server, a web server, a portable computing device, a personal computer, or any electronic computing device. As shown in FIG. 6, the computing device 2600 may include one or more processors with one or more levels of cache memory and a memory controller (collectively labelled 2602) that can be configured to communicate with a storage subsystem 2606 that includes main memory 2608 and persistent storage 2610. The main memory 2608 can include dynamic random-access memory (DRAM) 2618 and read-only memory (ROM) 2620 as shown. The storage subsystem 2606 and the cache memory 2602 and may be used for storage of information, such as details associated with transactions and blocks as described in the present disclosure. The processor(s) 2602 may be utilized to provide the steps or functionality of any embodiment as described in the present disclosure.

The processor(s) 2602 can also communicate with one or more user interface input devices 2612, one or more user interface output devices 2614, and a network interface subsystem 2616.

A bus subsystem 2604 may provide a mechanism for enabling the various components and subsystems of computing device 2600 to communicate with each other as intended. Although the bus subsystem 2604 is shown schematically as a single bus, alternative embodiments of the bus subsystem may utilize multiple busses.

The network interface subsystem 2616 may provide an interface to other computing devices and networks. The network interface subsystem 2616 may serve as an interface for receiving data from, and transmitting data to, other systems from the computing device 2600. For example, the network interface subsystem 2616 may enable a data technician to connect the device to a network such that the data technician may be able to transmit data to the device and receive data from the device while in a remote location, such as a data centre.

The user interface input devices 2612 may include one or more user input devices such as a keyboard; pointing devices such as an integrated mouse, trackball, touchpad, or graphics tablet; a scanner; a barcode scanner; a touch screen incorporated into the display; audio input devices such as voice recognition systems, microphones; and other types of input devices. In general, use of the term "input device" is intended to include all possible types of devices and mechanisms for inputting information to the computing device 2600.

The one or more user interface output devices 2614 may include a display subsystem, a printer, or non-visual displays such as audio output devices, etc. The display subsystem may be a cathode ray tube (CRT), a flat-panel device such as a liquid crystal display (LCD), light emitting diode (LED) display, or a projection or other display device. In general, use of the term "output device" is intended to include all possible types of devices and mechanisms for outputting information from the computing device 2600. The one or more user interface output devices 2614 may be used, for example, to present user interfaces to facilitate user interaction with applications performing processes described and variations therein, when such interaction may be appropriate.

The storage subsystem 2606 may provide a computer-readable storage medium for storing the basic programming and data constructs that may provide the functionality of at least one embodiment of the present disclosure. The applications (programs, code modules, instructions), when executed by one or more processors, may provide the functionality of one or more embodiments of the present disclosure, and may be stored in the storage subsystem 2606. These application modules or instructions may be executed by the one or more processors 2602. The storage subsystem 2606 may additionally provide a repository for storing data used in accordance with the present disclosure. For example, the main memory 2608 and cache memory 2602 can provide volatile storage for program and data. The persistent storage 2610 can provide persistent (non-volatile) storage for program and data and may include flash memory, one or more solid state drives, one or more magnetic hard disk drives, one or more floppy disk drives with associated removable media, one or more optical drives (e.g., CD-ROM or DVD or Blue-Ray) drive with associated removable media, and other like storage media. Such program and data can include programs for carrying out the steps of one or more embodiments as described in the present disclosure as well as data associated with transactions and blocks as described in the present disclosure.

The computing device 2600 may be of various types, including a portable computer device, tablet computer, a workstation, or any other device described below. Additionally, the computing device 2600 may include another device that may be connected to the computing device 2600 through one or more ports (e.g., USB, a headphone jack, Lightning connector, etc.). The device that may be connected to the computing device 2600 may include a plurality of ports configured to accept fibre-optic connectors. Accordingly, this device may be configured to convert optical signals to electrical signals that may be transmitted through the port connecting the device to the computing device 2600 for processing. Due to the ever-changing nature of computers and networks, the description of the computing device 2600 depicted in FIG. 6 is intended only as a specific example for purposes of illustrating the preferred embodiment of the device. Many other configurations having more or fewer components than the system depicted in FIG. 6 are possible.

ENUMERATED EXAMPLE EMBODIMENTS

Examples of the embodiments of the present disclosure can be described in view of the following clauses:

1. A method of communicating at least one secret from a sender to a recipient, the method comprising:

sending, from the sender to the recipient, information identifying a plurality of secrets selectable by the recipient;

receiving, at the sender, from the recipient, at least one first public key, corresponding to a respective first said secret selected for access by the recipient, wherein the or each said first public key is part of a public key/private key pair of an elliptic curve cryptography system and a first private key corresponding to said first public key is accessible to the recipient;

receiving, at the sender, from the recipient, at least one second public key, corresponding to a respective second said secret not selected for access by the recipient, wherein the or each said second public key is a public key of said elliptic curve cryptography system and a respective second private key, corresponding to said second public key, is not available to the recipient;

sending, from the sender to the recipient, at least one said first secret encrypted by means of the corresponding said first public key; and sending, from the sender to the recipient, at least one said second secret encrypted by means of the corresponding said second public key;

wherein the or each said first secret is accessible to said recipient by means of the corresponding said first private key, the or each said second secret is inaccessible to said recipient, and said sender is unable to distinguish between a said first secret and a said second secret.

This provides the advantage of improving security of data of the method by only allowing a recipient to have access to a limited number of messages, while preventing the sender from knowing which message or messages the recipient has accessed.

2. A method according to clause 1, further comprising encrypting at least one said first secret by means of the corresponding said first public key and encrypting at least one said second secret by means of the corresponding said second public key.

3. A method according to clause 2, wherein at least one said first secret and at least one said second secret are encrypted by means of a respective exclusive OR cipher.

This provides the advantage of enabling rapid and efficient encryption and decryption.

4. A method according to clause 3, wherein at least one said exclusive OR cipher has a respective encryption key based on the corresponding said first or second public key.

5. A method according to clause 4, wherein at least one said encryption key comprises the corresponding said first or second public key, multiplied by a respective first or second encryption integer, known to the sender, by means of scalar elliptic curve point multiplication.

6. A method according to clause 5, further comprising sending, from said sender to said recipient, at least one said first and/or second encryption integer, encrypted by means of the corresponding said first or second public key.

7. A method according to any one of the preceding clauses, wherein at least one said first secret is encrypted by means of a respective third public key containing a respective first masking term comprising a result of scalar multiplication, by a respective first masking integer, known to the sender, of an elliptic curve generator point of the elliptic curve cryptography system, added to a respective first encryption term by means of elliptic curve point addition.

8. A method according to clause 7, wherein at least one said first encryption term comprises a result of scalar multiplication of the elliptic curve generator point by a respective third encryption integer dependent on the corresponding said first public key.

9. A method according to clause 8, wherein at least one said third encryption integer is a hash value of the corresponding said first public key.

10. A method according to any one of clauses 7 to 9, wherein at least one said second secret is encrypted by means of a respective fourth public key containing a respective second masking term comprising a result of scalar multiplication, by a respective second masking integer, known to the sender, of the elliptic curve generator point of the elliptic curve cryptography system, added to a respective second encryption term by means of elliptic curve point addition.

11. A method according to clause 10, wherein at least one said second encryption term comprises a result of scalar multiplication of the elliptic curve generator point by a respective fourth encryption integer dependent on the corresponding said second public key.

12. A method according to clause 11, wherein at least one said fourth encryption integer is a hash value of the corresponding said second public key.

13. A method according to any one of the preceding clauses, wherein at least one said first and/or second public key can be determined from the corresponding said second and/or first public key.

14. A method according to any one of the preceding clauses, further comprising generating at least one third secret, to be shared between the sender and the recipient.

15. A method according to clauses 13 and 14, wherein at least one said first and/or second public key is based on the corresponding said second and/or first public key and at least one said third secret.

16. A method according to any one of the preceding clauses, further comprising checking, at said sender, consistency of at least one said first and/or second public key, received from the recipient, with the corresponding said second and/or first public key received from the recipient.

17. A method according to any one of the preceding clauses, wherein a result of scalar multiplication of at least one said first public key by a said second private key is equal to a result of scalar multiplication of a respective said second public key by a respective said first private key.

18. A method according to any one of the preceding clauses, wherein at least one said first private key and at least one said second private key are derived deterministically from a private key of said elliptic curve cryptography system known to the sender.

19. A method of receiving at least one secret sent from a sender to a recipient, the method comprising:
receiving, at the recipient, information identifying a plurality of secrets selectable by the recipient;
sending, to the sender, from the recipient, at least one first public key, corresponding to a respective first said secret selected for access by the recipient, wherein the or each said first public key is part of a public key/private key pair of an elliptic curve cryptography system and a first private key corresponding to said first public key is accessible to the recipient;
sending, to the sender, from the recipient, at least one second public key, corresponding to a respective second said secret not selected for access by the recipient, wherein the or each said second public key is a public key of said elliptic curve cryptography system and a respective second private key, corresponding to said second public key, is not available to the recipient;
receiving, at the recipient from the sender, at least one said first secret encrypted by means of the corresponding said first public key; and
receiving, at the recipient from the sender, at least one said second secret encrypted by means of the corresponding said second public key;
wherein the or each said first secret is accessible to said recipient by means of the corresponding said first private key, the or each said second secret is inaccessible to said recipient, and said sender is unable to distinguish between a said first secret and a said second secret.

20. A method according to clause 19, wherein at least one said first secret and at least one said second secret are encrypted by means of a respective exclusive OR cipher.

21. A method according to clause 20, wherein at least one said exclusive OR cipher has a respective encryption key based on the corresponding said first or second public key.

22. A method according to clause 21, wherein at least one said encryption key comprises the corresponding said first or second public key, multiplied by a respective first or second encryption integer, known to the sender, by means of scalar elliptic curve point multiplication.

23. A method according to clause 22, further comprising receiving, at said recipient from said sender, at least one said first and/or second encryption integer, encrypted by means of the corresponding said first or second public key.

24. A method according to any one of clauses 19 to 23, wherein at least one said first secret is encrypted by means of a respective third public key containing a respective first masking term comprising a result of scalar multiplication, by a respective first masking integer, known to the sender, of an elliptic curve generator point of the elliptic curve cryptography system, added to a respective first encryption term by means of elliptic curve point addition.

25. A method according to clause 24, wherein at least one said first encryption term comprises a result of scalar multiplication of the elliptic curve generator point by a respective third encryption integer dependent on the corresponding said first public key.

26. A method according to clause 25, wherein at least one said third encryption integer is a hash value of the corresponding said first public key.

27. A method according to any one of clauses 24 to 26, wherein at least one said second secret is encrypted by means of a respective fourth public key containing a respective second masking term comprising a result of scalar multiplication, by a respective second integer, known to the sender, of the elliptic curve generator point of the elliptic curve cryptography system, added to a respective second encryption term by means of elliptic curve point addition.

28. A method according to clause 27, wherein at least one said second encryption term comprises a result of scalar multiplication of the elliptic curve generator point by a respective fourth encryption integer dependent on the corresponding said second public key.

29. A method according to clause 28, wherein at least one said fourth encryption integer is a hash value of the corresponding said second public key.

30. A method according to any one of clauses 19 to 29, wherein at least one said first and/or second public key can be determined from the corresponding said second and/or first public key.

31. A method according to any one of clauses 19 to 30, further comprising generating at least one third secret, to be shared between the sender and the recipient.

32. A method according to clauses 30 and 31, wherein at least one said first and/or second public key is based on the corresponding said second and/or first public key and at least one said third secret.

33. A method according to any one of clauses 19 to 32, wherein a result of scalar multiplication of at least one said first public key by a said second private key is equal to a result of scalar multiplication of a respective said second public key by a respective said first private key.

A computer implemented system arranged to carry out a method according to any one of the preceding clauses.

It should be noted that the above-mentioned embodiments illustrate rather than limit the invention, and that those skilled in the art will be capable of designing many alternative embodiments without departing from the scope of the invention as defined by the appended claims. In the claims, any reference signs placed in parentheses shall not be construed as limiting the claims. The word "comprising" and "comprises", and the like, does not exclude the presence of elements or steps other than those listed in any claim or the specification as a whole. In the present specification, "comprises" means "includes or consists of" and "comprising" means "including or consisting of". The singular reference of an element does not exclude the plural reference of such elements and vice-versa. The invention may be implemented by means of hardware comprising several distinct elements, and by means of a suitably programmed computer. In a device claim enumerating several means, several of these means may be embodied by one and the same item of hardware. The mere fact that certain measures are recited in mutually different dependent claims does not indicate that a combination of these measures cannot be used to advantage.

1 REFERENCES

[1] "Generalised Oblivious Transfer Protocol", Partha Sarathi Roy, Department of Pure mathematics, University Cacutta India
[2] "Generalised oblivious transfer by secret sharing" Tamir Tassa
[3] "Computationally secure oblivious transfer" Moni Naor, Benny Pinkas
[4] "The simplest protocol for oblivious transfer" Tung Chou and Claudio Orlandi
[5] "Smooth projective hashing and two message oblivious transfer" Yuri Tauman KAlai MIT
[6] "Oblivious Transfer with Access Control" Jan Camenisch, Maria Dubovitskaya, Gregory Neven
[7] "Practical Fully Simulatable Oblivious Transfer with Sub-linear communication" BingSheng Zhang, Helger Lipmaa, Cong Wang, Kuri Ren
[8] Rabin (1981) for papers on oblivious transfer
[9] Bellare M.; Micalli, S. [1989] "Non-Interactive Oblivious Transfer and Applications." Proc. On Adv in Cryptography CRYPTO 89. PP 547-557.
[10] Diffie, W.; Hellman, M. (1976). "New directions in cryptography" (PDF). *IEEE Transactions on Information Theory.* 22 (6): 644-654. doi:10.1109/TIT.1976.1055638.
[11] Prof Bill Buchanan, www.asecuritysite.com
[12] Boneh, Franklin, "Identity-Based Encryption from the Weil Pairing". Appears in SIAM J. of Computing, Vol. 32, No. 3, pp. 586-615, 2003. An extended abstract of this paper appears in the Proceedings of Crypto 2001, volume 2139 of Lecture Notes in Computer Science, pages 213-229, Springer-Verlag, 2001. "Bilinear paring."

The invention claimed is:

1. A method of communicating a secret from a sender to a recipient, each having a respective public key/private key pair, the method comprising:
sending, from the sender to the recipient, information identifying a plurality of secrets selectable by the recipient;
generating a third secret, to be shared between the sender and the recipient, from the respective public key/private key pairs held by the sender and recipient;
receiving, at the sender, from the recipient, a first public key, corresponding to a first secret, of the plurality of secrets, selected for access by the recipient, wherein the first public key is part of a public key/private key pair of an elliptic curve cryptography system and a first private key corresponding to the first public key is accessible to the recipient, and wherein the first public key has been generated by the recipient from its respective public key/private key pair;
receiving, at the sender, from the recipient, a second public key, corresponding to a second secret, of the plurality of secrets, not selected for access by the recipient, wherein the second public key is a public key of the elliptic curve cryptography system and a second private key, corresponding to the second public key, is not available to the recipient, wherein the second public key is based on the public key/private key pair and the third secret;
encrypting the first secret by means of the corresponding first public key and sending it from the sender to the recipient; and
encrypting the second secret by means of the corresponding second public key and sending it from the sender to the recipient;
wherein the first secret is accessible to the recipient by means of the corresponding first private key, the second secret is inaccessible to the recipient, and the sender is unable to distinguish between the first secret and the second secret.

2. The method according to claim 1, wherein the first secret is encrypted using a third public key derived from said first public key, containing a first masking term comprising a result of scalar multiplication, by a first masking integer, known to the sender, of an elliptic curve generator point of the elliptic curve cryptography system, added to a first encryption term by means of elliptic curve point addition.

3. The method according to claim 2, wherein the first encryption term comprises a result of scalar multiplication of the elliptic curve generator point by a third encryption integer dependent on the first public key.

4. The method according to claim 3, wherein the third encryption integer is a hash value of the first public key.

5. The method according to claim 2, wherein the second secret is encrypted using a fourth public key derived from said second public key, containing a second masking term comprising a result of scalar multiplication, by a second masking integer, known to the sender, of the elliptic curve generator point of the elliptic curve cryptography system, added to a second encryption term by means of elliptic curve point addition.

6. The method according to claim 5, wherein the second encryption term comprises a result of scalar multiplication of the elliptic curve generator point by a fourth encryption integer dependent on the second public key.

7. The method according to claim 6, wherein the fourth encryption integer is a hash value of the second public key.

8. The method according to claim 1, wherein a result of scalar multiplication of the first public key by the second private key is equal to a result of scalar multiplication of the second public key by the first private key.

9. A method of receiving a secret sent from a sender to a recipient, each having a respective public key/private key pair, the method comprising:
   receiving, at the recipient, information identifying a plurality of secrets selectable by the recipient;
   generating a third secret, to be shared between the sender and the recipient, from the respective public key/private key pairs held by the sender and recipient;
   generating, at the recipient, a first public key, a first private key corresponding to the first public key, and a second public key, all being of an elliptic curve cryptography system, wherein the first public key is generated from the recipient's respective public key/private key pair, the first private key is based on the first public key, the second public key is based on the first public key/first private key pair and the third secret, and a second private key corresponding to the second public key is not known to the recipient
   sending, to the sender, from the recipient, the first public key, corresponding to a first secret, of the plurality of secrets, selected for access by the recipient;
   sending, to the sender, from the recipient, the second public key, corresponding to a second secret, of the plurality of secrets, not selected for access by the recipient;
   receiving, at the recipient from the sender, a first secret encrypted by means of the corresponding first public key; and
   receiving, at the recipient from the sender, a second secret encrypted by means of the corresponding second public key,
   wherein the first secret is accessible to the recipient by means of the corresponding first private key, the second secret is inaccessible to the recipient, and the sender is unable to distinguish between the first secret and the second secret.

10. The method according to claim 9, wherein the first secret is encrypted using a third public key derived from the first public key, containing a first masking term comprising a result of scalar multiplication, by a first masking integer, known to the sender, of an elliptic curve generator point of the elliptic curve cryptography system, added to a first encryption term by means of elliptic curve point addition.

11. The method according to claim 10, wherein the first encryption term comprises a result of scalar multiplication of the elliptic curve generator point by a third encryption integer dependent on the first public key.

12. The method according to claim 11, wherein the third encryption integer is a hash value of the first public key.

13. The method according to claim 10, wherein the second secret is encrypted using a respective fourth public key derived from said second public key, containing a second masking term comprising a result of scalar multiplication, by a second integer, known to the sender, of the elliptic curve generator point of the elliptic curve cryptography system, added to a second encryption term by means of elliptic curve point addition.

14. The method according to claim 13, wherein the second encryption term comprises a result of scalar multiplication of the elliptic curve generator point by a fourth encryption integer dependent on the second public key.

15. The method according to claim 14, wherein the fourth encryption integer is a hash value of the second public key.

16. The method according to claim 9, wherein a result of scalar multiplication of the first public key by the second private key is equal to a result of scalar multiplication of the second public key by the first private key.

17. A computer-implemented comprising:
   a processor; and
   non-transitory computer-readable memory with instructions that, if executed by the processor, cause the system to:
      receive, at a recipient having a respective public key/private key pair, information identifying a plurality of secrets selectable by the recipient;
      generate a third secret, to be shared between a sender having a respective public key/private key pair, and the recipient, from the respective public key/private key pairs held by the sender and recipient;
      generate, at the recipient, a first public key, a first private key corresponding to the first public key, and a second public key, all being of an elliptic curve cryptography system, wherein the first public key is generated from the recipient's respective public key/private key pair, the first private key is based on the first public key, the second public key is based on the first public key/first private key pair and the third secret, and a second private key corresponding to the second public key is not known to the recipient
      send, to the sender, from the recipient, the first public key, corresponding to a first secret, of the plurality of secrets, selected for access by the recipient;
      send, to the sender, from the recipient, the second public key, corresponding to a second secret, of the plurality of secrets, not selected for access by the recipient;
      receive, at the recipient from the sender, a first secret encrypted by means of the corresponding first public key; and
      receive, at the recipient from the sender, a second secret encrypted by means of the corresponding second public key,
      wherein the first secret is accessible to the recipient by means of the corresponding first private key, the second secret is inaccessible to the recipient, and the sender is unable to distinguish between the first secret and the second secret.

* * * * *